Patented Nov. 3, 1942

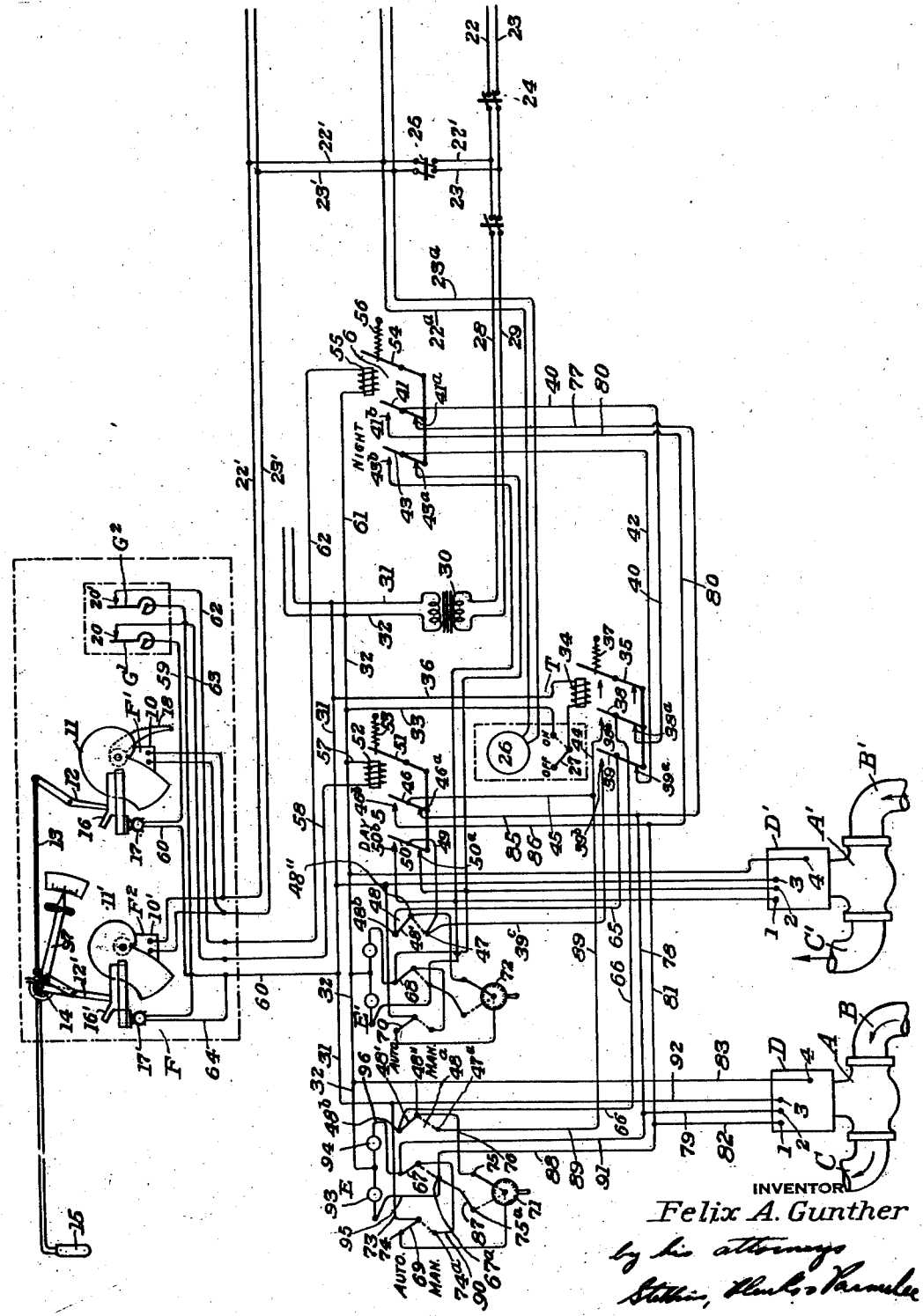

2,301,040

UNITED STATES PATENT OFFICE 2,301,040

HEAT CONTROL SYSTEM

Felix A. Gunther, Pittsburgh, Pa., assignor to Bocjl Corporation, Pittsburgh, Pa., a corporation of Delaware Application October 2, 1939, Serial No. 297,619

13 Claims. (Cl. 236—46)

This invention relates to heat control systems for buildings and is for a control system particularly applicable for use with heat control apparatus of the type wherein an outdoor temperature-responsive element cooperates with a program cam which is clock-driven for periodically turning the heat on and off for periods of irregular duration according to fluctuations in the outside temperature. Such type of outdoor control is disclosed in my copending application Serial No. 756,966, filed January 11, 1934, now issued as Patent No. 2,174,558.

In the adaptation of heat control devices of the type referred to and as disclosed in my said application, it is intended that such systems find their greatest application to large buildings, particularly office buildings. The heating systems in large buildings such as large office buildings are usually divided into a number of zones, each zone supplying heat to a given portion of the building. While it is possible to simultaneously control all of the zones from a single automatic heat control unit, it is preferable to group several zones into a section covering a considerable part of the whole building, and have an automatic control panel for each section or group. This is because different parts of the same building are simultaneously subjected to different outdoor temperature conditions, as exposure to sun, wind or proximity of neighboring buildings. As a specific example, in a square building there might be four control panels, one covering all of the zones in the east side of the building, another south, etc. Such a grouping of zones into sections provides flexibility of control without requiring that there be a separate automatic control panel for each individual zone.

The present invention enables a single control unit to govern the heating program of a number of zones. Heating systems of this character are adapted to heat the building in accordance with a pre-arranged program or schedule. For example, in an office building the heat is turned on and off during the day a sufficient number of times and for periods of sufficient duration to maintain an average room temperature of approximately 72°. During the night, say from 6 o'clock in the evening until 6 o'clock in the morning the program cam allows the average temperature to drop to say about 65° and from 6 A. M. until perhaps 7:30 there is a heating up period to bring the building temperature up to around 72°. It frequently happens in an office building that certain offices are occupied during the evening or night so that the heat has to be maintained at the higher temperature of around 72° and of course it cannot be predicted which offices will require heat over a longer period and will be occupied at night and when they will be so occupied.

The purpose of the present invention is to provide a system of control which will maintain the regular program established for the building in all of the several zones which it controls but wherein a great flexibility is provided in enabling any one zone to be supplied with heat according to its requirements at any time. For example, when a given suite of offices is to be occupied at night, the present system enables one zone or any selected zones to be operated on day schedule while the remaining zones are operating on the night schedule all under the operation of a single control unit which enables any zone to be immediately operated independently of the other zones and without reference to the program cam at all. The system further provides that when a tenant enters the building after the night program has been established, heat can be instantly supplied to the zone in which his office is located entirely independently of whether the control system may at that particular instant be in a period where the steam is off or on.

It also happens that one or more zones out of several that are subject to control from a single control unit cool off more rapidly than other zones in the same building under the same control unit or there may be insufficient radiation in some zones or defective piping. The present system will, because of one or more zones maintaining inadequate temperatures while other zones subject to the same control are adequately supplied, aid in revealing which zones are defective in any of these respects and enable the building manager to take care of the defect and also enable heat to be supplied at a greater rate to any such zone while the other zones under control of the same unit operate according to the program.

In brief, the present system provides a system of mechanical control wherein a single outdoor-indoor unit will normally control a number of heating zones according to a pre-arranged program but wherein any particular zone may be operated contrary to the program and according to the requirements of the occupants of the building at any time without taking the other zones off the program and according to which any unusual or irregular condition in any one zone can be compensated for. The invention may be more fully understood with reference to the accompanying drawing which illustrates a present and preferred embodiment of my invention and in which the figure is a diagrammatic view of the circuits and apparatus comprising my invention.

In the drawing the entire heating system of course has not been shown, as the invention resides in the controls and not in the heating system per se. Consequently in the drawing I have shown only the valves for controlling the admission of steam to the separate zones. Moreover, I have illustrated only two valves and the accompanying control circuits, but there may be any number of valves controlled from a single control unit. For the purpose of simplicity only two have been shown. Additional valves for additional zones would require only the duplication of the circuits illustrated or the extension of the circuits illustrated in the manner which is obvious to those skilled in the art. Two valves are sufficient to illustrate the principle of flexibility of control provided by the invention.

In the drawing, A and A' represent two valves or other sources of heat. They are each provided with inlet pipes B and B' that may be manifolded to a single supply main not illustrated. Each is illustrated as having outlet pipes C and C' respectively which carry the steam to the separate heating systems or zones of a building. A small building might have only a single valve A and the heating system may not be divided into zones at all, whereas a large building may have as many as 40 or more zones each of which would have its own valve A. For the purpose of the present invention, each of the valve units A and A' may be considered as having a separate mechanism schematically illustrated at D and D' respectively corresponding to that illustrated in Figure 9 of the drawing of my said copending application. For the purpose of more clearly understanding the circuits, it may be pointed out that each valve has a valve element with a valve stem that is reciprocated by a cam. As explained in my said copending application, the cam is on a shaft which is driven always in the same direction, and when the high part of the cam is in one position, the valve is closed and when the high part of the cam is 180° opposite, the valve is open. An electric motor drives the cam shaft through a reducing gear, and there are three control cams on the cam shaft for governing the operation of the motor. One of these is called a circuit-maintaining cam which opens a switch to supply current to the motor when the valve is either open or closed but which supplies current to the motor while the cam shaft is being rotated to move the valve from the open to the closed position or vice versa. A second cam-operated switch is designated the "on" cam switch. This cam serves to close a switch when the valve is closed and the next operation to be performed is to turn the heat on. It is so arranged that it supplies current to the motor only to initiate the operation of the motor until the maintaining switch is closed. A third switch operated from this cam shaft is the "off" switch. This switch is closed at the time the valve is open and the steam is turned on and when the next operation to be performed is to close the valve to turn off the heat. It is 180° out-of-phase with the "on" cam switch and like the "on" cam switch it opens after the operation of the driving motor has been initiated and the maintaining switch is closed to continue to operate the valve to the closed position. It will therefore be seen that the maintaining switch is open when the valve is either fully opened or fully closed, and serves to supply current to the motor after the operation of the motor has been initiated to move the valve from one position to the other. The "on" and "off" cams are 180° out-of-phase and the "on" cam closes a switch when the valve is closed and the heat is turned off and the "off" cam closes a switch when the heat is turned on.

In the drawing, terminal 1 on each cam valve control unit D leads to the "on" switch. Terminal 2 leads to the "off" switch. Terminal 3 leads to the maintaining cam, and terminal 4 is the common return side or contact for each of the other three switches.

All of the rest of the apparatus in the circuit illustrated has to do with the wires leading to the terminals 1, 2, 3, and 4.

The control apparatus comprises a time switch T for changing the control circuit from the day program to the night program and from the night program to the day program according to a predetermined schedule. This in turn controls the operation of a day relay designated generally as 5 and a night relay designated generally as 6. E designates a switch control panel for valve A and E' is a switch control panel for valve A'. The automatic temperature-responsive heat control apparatus more or less schematically illustrated at F corresponds to the control apparatus disclosed in my said copending application. The control unit F includes two motor-driven cam devices of which $F^1$ governs the heating-up and day schedule of operation and $F^2$ establishes or maintains the normal night schedule of operation. In conjunction with the day cam unit $F^1$ is an indoor thermostat hereinafter called the day thermostat designated $G^1$, and there is a similar indoor thermostat $G^2$ in circuit with the night cam unit $F^2$.

Referring first to the control unit designated generally as F, the day cam unit $F^1$ comprises an electrically driven clock 10 which rotates a heat control cam 11. The cam 11 and its construction preferably correspond to the construction described in detail in my said copending application. This cam cooperates with a pivoted arm 12 which arm is moved toward and from the center of the cam 11 through a link 13 operated from a temperature-responsive element or thermostat 14. The temperature-responsive element or thermostat is illustrated as being of the type wherein there is an outdoor bulb 15 positioned on the outside of the building whose temperature is to be controlled, the arrangement being such that as the outdoor temperature falls, the arm 12 is caused to move in toward the center of the cam 11 and as the temperature rises, the arm 12 moves toward the periphery of the cam 11. The arm 12 is of a resilient character. When the cam 11 passes under the terminal of the arm 12, the arm 12 is sprung outwardly in a direction normal to the face of the cam 11, and when the terminal of the arm 12 rides off the cam 11 it springs back in the opposite direction. The springing of the arm 12 in a direction normal to the plane of the cam 11 is used to rock a pivoted cradle element 16 which carries a mercury tube switch 17. When the terminal of the arm 12 is engaging the surface of the cam 11, the cradle 16 is tilted so that a circuit is closed through the mercury tube switch 17, and when the terminal of the arm 12 is clear of the cam 11, the mercury tube switch 17 is tilted to a position where its contacts do not close a circuit.

The construction and arrangement of this cam temperature control unit are fully described and claimed in my said copending application and it need only be said here that by reason of this arrangement the cam 11 serves at regular intervals to engage the terminal of the arm 12 when the outside temperature is below a predetermined point and thereby cause the switch 17 to close a circuit at regular intervals. The circuit will be kept closed for a longer or shorter period depending on whether the terminal of the arm 12 is near the periphery of the cam or near the center of the cam 11. The closer the terminal of the arm 12 is to the center of the cam 11, the longer will be the periods in which the switch 17 is closed. The switch 17 is for the purpose of turning on heat when heat is needed, and the longer the mercury tube switch is closed, the longer will be the "on" periods for the heat.

In addition to the cam 11 the unit F¹ has a second cam which is rotated once every 24 hours and which is designated 18. As expressed in my copending application, the cam 18 is a heating up cam. It is designed to engage the arm 12 at that time in the morning just before the building is to be occupied to bring the temperature of the building up from the lower night temperature to the higher day temperature.

The night cam unit F² is substantially the same as the day cam unit F¹, it having a motor-driven clock 10', a cam 11' corresponding to cam 11, a temperature responsive arm 12' corresponding to the arm 12 and operated from the same temperature-responsive mechanism 14 as the arm 12, the two being coupled so that only a single outdoor thermostat is required for both units F¹ and F². The arm 12' operates a cradle 16' which carries a mercury tube switch 17' arranged similarly to the mercury tube switch 17.

The mercury tube switch 17 of unit F¹ is in series with the contacts 20 of the day thermostat G¹ and the mercury tube switch 17' is in series with the contacts 20' of the night thermostat G². The arrangement is such that if the mercury tube switch 17 is calling for heat; i. e., has been tilted to a closed position but the room temperature in which the control panel is housed is such as to open the contacts 20 of day thermostat G¹, the circuit through the mercury tube switch 17 will not be completed, and if the room temperature is such that the contacts 20' of the night thermostat G² are open, the circuit through the mercury tube switch 17' cannot be completed.

In the drawing, wires 22 and 23 are the main current supply lines to the system. 24 designates a manual switch in the supply lines. Wires 22' and 23' leading off the supply lines 22 and 23 respectively connect through a manual switch 25 to the motors 10 and 10' of the electric clocks for the units F¹ and F² respectively so that the clocks 10 and 10' operate continuously as long as the switches 24 and 25 are closed and it is only in an exceptional instance that either of these two switches would at any time be open. Another pair of wires 22a and 23a lead from the wires 22' and 23' respectively to the clock 26 of the time switch unit T. The time switch T operates a switch arm 27 at predetermined intervals between an on and an off position. It is in the "on" position which is the dotted line position shown in the figure during the day and in the "off" position during the night. Connected with the main power lines 22 and 23 are wires 28 and 29 which supply the primary winding of a step-down transformer 30. A lower voltage is used in the control circuit, and the secondary winding of the transformer 30 supplies this lower voltage current through wires 31 and 32. A wire 33 connects with the wire 32 and leads to one contact of the time switch T. The other contact of the time switch T passes through the coil 34 of an electromagnetic relay whose armature is designated 35. The other side of the relay field coil 34 is connected to the source of power 31 through wire 36. When the time switch T is closed for day operation, there is a circuit from wire 32 through wire 33, switch 27, relay winding 34 and wire 36 to wire 31 and back to the transformer. When the time switch 27 is open there is of course no current through the relay winding 34 and the armature 35 is pulled away from the field coil 34 by a spring 37.

The armature 35 of the relay is connected to two single pole double throw switches 38 and 39. When the magnet 34 is de-energized, the switch 38 closes a circuit with contact 38a and when the magnet 34 is energized, the contact at 38a is opened and the switch closes a circuit with contact 38b. Likewise, switch arm 39 engages contact 39a when the magnet 34 is de-energized and engages contact 39b when the magnet 34 is energized.

Contact 38a is connected through wire 40 with switch 41 of the night relay switch 6. Contact 39a of the time switch is connected through wire 42 with switch arm 43 of the night relay switch 6. Contact 38b of the time switch is connected through wire 44 and wire 45 with a switch arm 46 of the day relay operated switch 5, and contact 39b connects with a wire 39c that leads to switch terminal 47 of a change-over switch 48. A wire 49 leading from the contact 47 connects to switch arm 50 of the relay-operated day switch 5 so that there is a circuit from contact 39b to the switch arm 50. The day switch 5 in addition to having the two switch arms 46 and 50 has an armature 51 which is pivotally connected to the two arms 46 and 50 for rocking them. An electromagnet 52 is provided for operating the armature 51 in one direction while a spring 53 moves the armature in the opposite direction. When the magnet 52 is de-energized, the switch arm 46 engages a switch contact 46a and when the magnet 52 is energized, the switch arm 46 engages contact 46b. Likewise, switch arm 50 engages switch contact 50a when the relay 52 is de-energized and engages contact 50b when the magnet 52 is energized.

The two switch arms 41 and 43 of the night relay 6 are similarly connected with an armature 54 which is moved in one direction by a magnet 55 and in the opposite direction by a spring 56. When the magnet is de-energized, switch arm 41 engages contact 41a and switch arm 43 engages contact 43a. When the magnet 55 is energized, arm 41 engages contact 41b, and arm 43 engages contact 43b. One terminal of the coil 52 of the day relay switch 5 connects through wire 57 to wire 32 leading from one side of the supply current transformer 30. The other side of the electromagnet 52 connects through wire 58 to contact 20 of the day thermostat G¹ and from the day thermostat G¹ wire 59 leads to the mercury tube switch 17. From the mercury tube switch 17 the other terminal connects to wire 60 that leads back to wire 31 which connects to the other side of the current transformer 30 to complete the circuit for magnet 52. The arrangement is such that when the contact 20 of the day thermostat G¹ is closed and the outside temperature arm 12 is engaging the arm 11 to close the circuit through mercury tube switch 17, the magnet 52 will be energized, but if the circuit is interrupted at either mercury tube switch 17 or contact 20, the magnet 52 will be de-energized.

The magnet 55 of the night relay switch 6 has one side connected through wire 61 to wire 32 leading from one side of the current supply transformer 39. The other side of the electromagnet 55 leads through wire 62 to contact 20' of the night thermostat G², and from the other side of the thermostat a wire 63 leads from the thermostat switch 20' to mercury tube switch 17' and from mercury tube switch 17' there is a wire 64 connecting into the wire 60 so that the electromagnet 55 is energized whenever a circuit is completed through contact 20' and mercury tube switch 17' and is broken when either of these two switches is open.

For each of the valve units controlled by the control panel there is a panel board E, E', etc., having a series of switches. One of these switches is the change-over switch 48 which controls the valve-operating mechanism D' for the valve A'. A similar switch 48a is in the panel E for controlling the valve A, and if other valves were illustrated, there would be other switches corresponding to the switches 48 and 48a. The contact 38b in addition to being connected through wire 45 with switch contact 46 is also connected with a contact 47a of switch 48a and of any similar switches that would be provided. The change-over switches 48 and 48a are each provided with a switch arm 48', the switches 48 being single pole double throw switches. The switch arm 48' in each case is pivoted to a switch terminal 48''.

It should be pointed out that the time switch has a number of switch arms corresponding to the switch arms 38 and 39, the number of these switch arms corresponding to the number of valves to be controlled. The contact 48b of each of the switches 48 and 48a connects to one of these switch arms of the time switch, the contact 48b of switch 48 being connected through wire 65 to the switch arm 39 while the corresponding contact 48b of switch 48a is connected through wire 66 with the switch arm 38. Similarly, if there were other valves illustrated and other switch panels with switches corresponding to the change-over switches 48 and 48a, they would be connected to a similar switch member under the control of the main time switch T. Each of the switch panels E and E' in addition to having the switches 48a and 48 respectively as described have another single pole double throw switch which may be termed an "on and off" switch designated 67 in the panel on the switch board E and 68 on the panel E'. Each switch panel E and E' also has another single pole double throw switch, designated 69 on switch board E and 70 on switch board E'. This last-named switch will be referred to as the "automatic-manual" switch. The purpose of the automatic-manual switches 69 and 70 is to enable the valves controlled by the respective switch boards to operate with the automatic control under the direction of the time-temperature control panel F or to be switched so as to be operated by manual control. The purpose of the switches 67 and 68, termed the on and off switches, is to enable the heat to be turned on and off manually when the automatic-manual switch is set for manual control. The purpose of the change-over switches 48 and 48a is to enable the valve controlled by the respective switches to operate according to the program established by the time switch T or to enable any particular valve to be operated according to the day program even though the time switch may be establishing a night heating program for the rest of the building. In addition to the three switches; i. e., the automatic-manual, the on-off and the schedule change-over switch, each of the switch boards E and E' has another switch which is referred to as the "immediate-heat" switch and is designated 71 in the switch board E and 72 in the switch board E'. These switches 71 and 72 are single pole double throw switches with a clock attachment so that when the switch is moved from one position to another a clock mechanism is wound up which requires a certain number of minutes to unwind and after the lapse of a certain number of minutes, the switch automatically throws back to its original position. In other words they are automatic time switches which are manually moved to one position and remain in that position for only a limited period of time and then automatically restore themselves to the original position. Switches of this character are well known to those skilled in the art and are available on the market and form no part of the present invention per se.

For operating the valve D through the switch board E, wire 31 leading from the current supply transformer 30 is connected to a wire 73 leading to the switch 69. One contact 74 of the switch 69 leads to the immediate-heat switch 71. The switch arm of the immediate-heat switch 71 normally closes a circuit with contact 75. A wire 76 leading from the contact 75 goes to the live terminal of the switch 48' of switch 48a and this switch is normally set to close the circuit with its contact 48b. As previously explained, the contact 48b connects through wire 66 with the switch arm 38 of the main time switch T. From switch 38 the circuit may be completed through wire 40 to night switch 41. From switch contact 41a of switch 41 there is a wire 77 connecting to wire 78 leading in turn to wire 79 that contacts with the number 2 terminal of valve-operating mechanism D which is the "off" terminal. When the circuit is completed in this manner it will be noted that the magnet 34 of the time switch T is de-energized indicating that the automatic control is on the night schedule. Consequently the circuits are controlled through the night relay 6 and the night relay 6 is shown as being de-energized which means that no heat is called for by the control unit F² and therefore the circuit has been closed to contact 2 to turn off the heat.

If the magnet 55 of the night relay switch is now energized, the circuit will then be completed from switch 38 and contact 38a and wire 40 to switch arm 41 and thence to contact 41b and from contact 41b through wire 80 and wire 81, wire 82 to the number 1 contact of the valve-operating mechanism D which is the "on" contact. The circuit through the valve-operating mechanism is initially from either contacts 1 or 2 to contact 4 and from contact 4 through wire 83 to wire 32 to the other side of the current supply transformer 30.

If the magnet 34 of time switch T had been energized, so that the system was operating on the day schedule instead of on the night schedule, current flowing from the switch contact 48b to the switch 38 would then complete a circuit through contact 38b, wire 45, switch 46, contact 46a and wire 85 to wire 78 and from wire 79 to contact 2 which is the "off" contact, the day relay switch 5 being in the "off" position. If the magnet 52 were energized as well as the magnet 34, the circuit would then have been from the switch arm 38 and contact 38b and wire 45 to switch 46 and from switch 46 to contact 46b' and thence through wire 86 to wire 81 and from wire 81 to wire 82 to the "on" contact terminal 1 of the valve-operating mechanism D.

The two paragraphs last preceding describe the normal circuits for operating the valve mechanism D under complete automatic control. It may next be assumed that the building is on night schedule when a tenant whose office is controlled by valve A comes into the building. The building may have been on night schedule for some time and the tenant would want immediate heat in the radiators. The night attendant signals the building engineer that immediate heat is required in the zone controlled by valve A whereupon the engineer turns the immediate-heat switch 71 thereby breaking the circuit with contact 75 and closing a circuit with contact 75a. From 75a there is a wire 87 to wire 88 which wire 88 also joins to contact 67a of the "off-on" switch 67. The wire 88 in turn connects to wire 82 leading to the "on" contact 1 of the valve-operating mechanism D for the valve A, thus immediately opening the valve A to supply heat to the zone which the valve A controls and without respect to what the position of the control cams may be. After the heat has been on for a few minutes depending upon the time setting of the switch 71, the switch will open the circuit with contact 75a and again engage contact 75 and restore the circuit to a normal automatic setting. If the tenant expects to remain in the room but a short time, this may be sufficient, but if the tenant expects to occupy the room for a considerable time, it will be desirable to supply more heat than is supplied by the normal night program. In order to do this the change-over switch arm 48' is thrown from engagement with contact 48b to contact 47a. The circuit is then from the automatic switch terminal 74 through the immediate-heat switch 71 to contact 75, to wire 76, to switch arm 48', to contact 47a and thence through wire 89 to wire 45 and day switch 46. As long as the switch 48' stays on the contact 47a the valve-operating mechanism D will be under the control of the day switch 5 notwithstanding that the other circuits may remain on the normal night program. Thus it is possible to heat the particular zone supplied by the valve A on the day schedule during the night heating program as long as may be necessary and then throw the valve back onto its night program as soon as the office has been vacated.

Under certain circumstances it may be necessary or desirable to operate the valve A manually without taking any of the valves in the heating system off the established program. This is accomplished first by throwing the switch 69 from the contact 74 to the contact 74a. Leading from the contact 74a is a wire 90 leading to the off-on switch 67. If the off-on switch 67 engages the contact 67a, the circuit from contact 74a of the automatic manual switch will be to the switch 67 to the contact 67a to wire 88 to wire 82 and contact 1 of the valve-operating mechanism D. This will serve to keep the heat turned on as long as this switch setting remains, but if the switch 67 is moved up to engage contact 67b, the circuit will then be through the switch 67 to contact 67b to wire 91, wire 79 and contact 2 of the unit D which is the "off" contact. By thus manually moving the switch 67 between the two positions, the heat can be arbitrarily turned on and off quite independently of the automatic mechanism and the automatic control circuits will be entirely ineffective to make any change in the operation of the valve A and will remain ineffective until the automatic manual switch has been restored to the automatic position, but the other valves in the system will continue to be subject to automatic control. Restoration of the switch 69 to the automatic position renders the manual off-on switch ineffective.

It has heretofore been pointed out that by energizing the contacts 1 and 2, the operation of the motor which opens or closes the valve A is merely initiated and that the circuit has to be maintained until the valve has reached a predetermined position through a maintaining circuit. The maintaining circuit, starting with the contact 3 which is the maintaining contact is connected to the power supply line 31 through wire 92. The other side of the maintaining circuit of course is through the common return wire 83.

For the purpose of showing the building engineer the exact position of any valve at any time, each switch board E, E', etc., is provided with red and green signal lights, the red light indicating when the heat is on and the green light indicating when the heat is off. On the switch panel E, 93 is the red light and 94 is the green light. One side of each lamp is connected to the current supply line 32. The other side of the red lamp 93 connects through wire 95 with wire 88 which in turn connects to the "on" contact wire 82 so that whenever the contact wire 82 is energized, the lamp 93 is also energized. The green lamp 94 has its other side connected through wire 96 to wire 91 which connects to the "off" contact wire 79 so that whenever the "off" contact 79 is energized, the lamp 94 will be likewise energized.

The switch arm 50 of the day switch 5 corresponds in function to that of the switch arm 46 except that the arm 50 controls the circuits to the valve-operating unit D' instead of D. Since the circuits are otherwise exactly similar to the circuits for the valve-operating mechanism D, it is needless to specifically describe the same as they may be traced in the same way that the circuit for the valve-operating mechanism D may be traced. It should be further pointed out that the day switch 5 would have additional switches and contacts corresponding to 46 and 50 for each additional valve to be controlled from the main outdoor thermostat control panel. Likewise, in the night relay switch 6 the switch arm 43 corresponds in function to the switch arm 41 and its circuits also pertain to the control of the valve-operating mechanism D'. Where an additional valve is included, an additional switch similar to 41 or 43 would be included. Thus there is one switch such as 38 or 39 in the main time switch T for each valve, there is one switch such as 46 or 50 in the day relay for each valve and there is one switch similar to 41 or 43 in the night relay switch for each valve.

The general operation of the invention may now be followed. There are two program cams 11 and 11' comprising the heating program unit. Cam 11 determines the day program and cam 11' determines the night program. The cams in conjunction with the temperature responsive arms 12 and 12' control the closing of circuits through switches 17 and 17' respectively. The switch 17 is in series with thermostat $G^1$ and mercury switch 17' is in series with night thermostat $G^2$. The cams in conjunction with the thermostats cause the intermittent energizing and de-energizing of the magnets 52 and 55 respectively of the day and night relay switches. Whether the system responds to the day cam or to the night cam depends in turn upon the time switch T which shifts the control of the system from and to the day and night relay switches 5 and 6. The switches 5 and 6 as well as the time switch T has a separate switch for each source of steam supply to be controlled. When the time switch T is set to cause the night switch 6 to operate, the control unit $F^2$ governs the operation of all of the valve-operating mechanisms D, D', etc., and when the time switch shifts the control to the day relay, the cam unit $F^1$ exercises the control. The control will be automatic as long as the automatic-manual switch 69 or 70 for any unit is in the automatic position, but any valve can be selectively put under manual control by throwing the automatic switch for any particular valve to the manual position. Any valve may be thrown under the control of the day cam unit $F^1$ even though the time switch T calls for the night program to be in effect and the change-over for any one valve does not affect the other valves. Likewise, immediate heating can be supplied to any zone without taking the system off the automatic control to temporarily supply heat to a zone requiring it. The changeover from automatic to manual control is effected through the switch 69 or 70 as the case may be. Manual control is then effected through the switch 67 or 68 as the case may be. The change-over from the regular program to a day program exclusively for any valve is accomplished by the valve 48 or 48a as the case may be.

The system described introduces a wide flexibility in the use of automatic heating equipment for office and other buildings particularly where there are a number of zones to be controlled from a single outdoor temperature-responsive unit and where different parts of the building have to be temporarily operated on a schedule different from other parts of the building erratically and without reference to any set program. The system enables the building to supply heat to the occupied zones of the building according to the times and conditions of occupancy without disturbing the general automatic set-up for control of the whole building or a part or section of the building where each part or section is sub-divided into several zones, each part being under a separate outdoor thermostatically controlled unit.

The cams 11 and 11' are designed to primarily establish the heating program for the building and the thermostats $G^1$ and $G^2$ are desirable for evening out any inaccuracies that may arise due to the cams being not exactly right for a particular installation. In other words, for production methods of manufacturing standard cams are provided which may very easily be reshaped by the heating engineer, but the re-shaping cannot, without considerable study and experiment, be such as to exactly fit the requirements of the building or the portion of the building which the cam units control. If the cams have a tendency to overheat, this will be corrected by the thermostats $G^1$ and $G^2$, but the thermostats do not constitute the primary source of control. The thermostats of course are incapable of turning on the heat unless the switches 17 or 17', as the case may be, are closed. Correction for underheating as well as overheating is provided for through the adjustment of the arms 12 and 12' with reference to their cams, as more fully explained in my said copending application. This adjusting mechanism is indicated in the drawing at 97. The present application is a continuation in part of my said copending application.

While I have used the terms "day" and "night" with reference to the cams and thermostats and relay switches, it will be understood that these are merely expressions to indicate alternate periods in which different heating schedules are employed and that the expressions "day" and "night" are not used in a limiting sense but rather as a means of distinguishing between periods when different schedules of temperatures are maintained. Also, while I have referred to "electrically operated valves," this is not by way of limitation and the term "valves" is intended to include other sources of heat supply susceptible to automatic control by the system herein described.

While I have illustrated and described specifically only one embodiment of my invention, it will be understood that the invention is not limited to the particular structure and arrangement of the parts disclosed and that it may be otherwise embodied within the scope and contemplation of the following claims.

I claim:

1. A heat control system comprising a time temperature control having two heating program mechanisms one being for maintaining a day heating program and the other being for maintaining a night heating program, a circuit opening and closing means forming a part of each of said program mechanisms, a plurality of separate electrically operated heat supply valves for supplying heat to different zones of a building, means whereby each of said circuit opening and closing means may control the opening and closing of all the heat supply valves, means including a time switch for rendering the day and night program mechanisms alternately effective over predetermined periods of time for controlling the valves, and selectively operable switch means for operating any valve independently of the said program mechanisms and time switch while the remainder of the system is governed by the program mechanisms and time switch.

2. A heat control system comprising a time temperature control having two heating program mechanisms one being for maintaining a day heating program and the other being for maintaining a night heating program, a circuit opening and closing means forming a part of each of said program mechanisms, a plurality of separate electrically operated heat supply valves for supplying heat to different zones of a building, means whereby each of said circuit opening and closing means may control the opening and closing of all the heat supply valves, means including a time switch for rendering the day and night program mechanisms alternately effective over predetermined periods of time for controlling the valves, selectively operable switch means for operating any valve independently of the said program mechanisms and time switch while the remainder of the system is governed by the program mechanisms and time switch, and other switch means for each valve selectively operable to connect a selected valve into the control circuits so that the day program mechanism controls said valve independently of the said night program mechanism and while the other valve mechanisms remain under the control of said night program mechanism.

3. A heat control system comprising a time temperature control having two heating program mechanisms one being for maintaining a day heating program and the other being for maintaining a night heating program, a circuit opening and closing means forming a part of each of said program mechanisms, a plurality of separate electrically operated heat supply valves for supplying heat to different zones of a building, means whereby each of said circuit opening and closing means may control the opening and closing of all the heat supply valves, means including a time switch for rendering the day and night program mechanisms alternately effective over predetermined periods of time for controlling the valves, selectively operable switch means for operating any valve independently of the said program mechanisms and time switch while the remainder of the system is governed by the program mechanisms and time switch, other switch means for each valve selectively operable to connect a selected valve into the control circuits so that the day program mechanism controls said valve independently of the said night program mechanism and while the other valve mechanisms remain under the control of said night program mechanism, and still another selectively operable time switch mechanism for each valve for opening the valve to admit steam to the zone controlled by it at any point in the heating program and keeping such valve open for a predetermined limited time and thereafter automatically restoring the circuit to automatic control through one of said program mechanisms and while the circuits for the other valves are unchanged.

4. A heat control system comprising a time temperature control having two heating program mechanisms one being for maintaining a day heating program and the other being for maintaining a night heating program, a circuit opening and closing means forming a part of each of said program mechanisms, a plurality of separate electrically operated heat supply valves for supplying heat to different zones of a building, means whereby each of said circuit opening and closing means may control the opening and closing of all the heat supply valves, means including a time switch for rendering the day and night program mechanisms alternately effective over predetermined periods of time for controlling the valves, selectively operable switch means for operating any valve independently of the said program mechanisms and time switch while the remainder of the system is governed by the program mechanisms and time switch, and a separate indoor thermostatic switch in series with each of the circuit closing means of the heating program mechanisms for exercising the secondary control over the heating program mechanisms whereby said circuit closing means are ineffective when the room thermostats are open.

5. A heating system comprising a control unit having a constantly driven cam and means responsive to outside temperature cooperating with the cam for closing an electric circuit intermittently for periods of time which vary according to outside temperature, a heat supply mechanism controlled by said control unit and said circuit, and an immediate-heat control means including a switch which is manually set and which automatically releases after a predetermined period of time for temporarily operating the heat supply mechanism independently of the control unit and thereafter automatically restoring the heat supply mechanism to operation by the control unit.

6. A heat control system comprising a time temperature control having two heating program mechanisms, each of said mechanisms comprising a cam and a movable arm cooperating with the cam, temperature responsive means for moving the said arm of each mechanism, one of said mechanisms being provided for maintaining a day heating program and the other for maintaining a night heating program, a circuit opening and closing means forming a part of each mechanism, a plurality of separate electrically operated heat supply valves, a day relay switch controlled by the day program mechanism, a night relay switch controlled by the night program mechanism, a control circuit for each valve controlled by both the day switch and the night switch, and a time switch for determining whether the day relay or the night relay controls the operation of the valves.

7. A heat control system comprising a time temperature control having two heating program mechanisms, each of said mechanisms comprising a cam and a movable arm cooperating with the cam, temperature responsive means for moving the said arm of each mechanism, one of said mechanisms being provided for maintaining a day heating program and the other for maintaining a night heating program, a circuit opening and closing means forming a part of each mechanism, a plurality of separate electrically operated heat supply valves, a day relay switch controlled by the day program mechanism, a night relay switch controlled by the night program mechanism, a control circuit for each valve controlled by both the day switch and the night switch, a time switch for determining whether the day relay or the night relay controls the operation of the valves, and an indoor thermostatic switch in series with the circuit opening and closing means of the day program mechanism and a night thermostatic switch in series with the circuit opening and closing means of the night program mechanism whereby said thermostats exercise a secondary control over the program mechanisms.

8. A heat control system comprising a central temperature control having two heating program mechanisms one being for maintaining a day heating program and the other being for maintaining a night heating program, a circuit opening and closing means forming a part of each program mechanism, means responsive to outdoor temperature controlling the opening and closing of said means, a plurality of separate electrically operated heat supply valves, circuits whereby each of said opening and closing means may control the operation of the valves, said circuits including a day relay switch operated by the circuit opening and closing means of the day heating program mechanism, a night relay switch operated by the circuit opening and closing means of the night program mechanism, a time switch for alternately transferring control between the day relay and night relay whereby all of the valves are operated according to a predetermined day and night program and according to variations in outside temperature, and a separate manually operable means for each electrically operated valve including a change-over switch by means of which any valve may be selectively operated on the day program independently of the time switch and while the other valves of the system remain subject to the control established through the time switch.

9. A heat control system comprising a central temperature control having two heating program mechanisms one being for maintaining a day heating program and the other being for maintaining a night heating program, a circuit opening and closing means forming a part of each program mechanism, means responsive to outdoor temperature controlling the opening and closing of said means, a plurality of separate electrically operated heat supply valves, circuits whereby each of said opening and closing means may control the operation of the valves, said circuits including a day relay switch operated by the circuit opening and closing means of the day heating program mechanism, a night relay switch operated by the circuit opening and closing means of the night program mechanism, a time switch for alternately transferring control between the day relay and night relay whereby all of the valves are operated according to a predetermined day and night program and according to variations in outside temperature, and a change-over switch for each valve by means of which any valve may be selectively operated on the day program independently of the time switch while the other valves remain subject to the control established through said time switch, said separate switch also including a selectively operable switch for rendering the automatic control circuit ineffective for any valve while the automatic control circuit remains effective as to all of the other valves in the system.

10. A heat control system comprising a central temperature control having two heating program mechanisms one being for maintaining a day heating program and the other being for maintaining a night heating program, a circuit opening and closing means forming a part of each program mechanism, means responsive to outdoor temperature controlling the opening and closing of said means, a plurality of separate electrically operated heat supply valves, circuits whereby each of said opening and closing means may control the operation of the valves, said circuits including a day relay switch operated by the circuit opening and closing means of the day heating program mechanism, a night relay switch operated by the circuit opening and closing means of the night program mechanism, a time switch for alternately transferring control between the day relay and night relay whereby all of the valves are operated according to a predetermined day and night program and according to variations in outside temperature, and a separate switch for each electrically operated valve, a change-over switch for each valve whereby each valve may be maintained exclusively under the control of the day program mechanism although the system as a whole remains subject to the control established through the main time switch, the central control also comprising an immediate heat control means including a switch which is manually set and automatically restored after a predetermined lapse of time for immediately setting the valve controlled by said switch in an open position irrespective of the program mechanism and without affecting the other valves governed by the program mechanism and for automatically restoring the valve to control by the program mechanism after a predetermined lapse of time.

11. A heat control system comprising a plurality of electrically controlled zone heating valves, a single time temperature control for all of said valves for effecting the operation thereof intermittently and for periods of time governed by outside temperature, circuits for controlling the several valves from said control in unison, a separate manual switch for each valve to selectively cause it to be manually controlled independently of the other valves and while the other valves remain under the control of said time temperature control, and a further manual-closing, self-opening switch for each valve for temporarily turning on any valve for a limited period of time only.

12. A heat control system comprising a plurality of electrically controlled zone heating valves, a time temperature control mechanism for all of said valves for affecting the opening and closing thereof intermittently and for periods of time governed by outside temperature, said control mechanism having day and night control units, a main time switch for alternately rendering the day and night units effective, circuits for controlling the several valves in unison from the said control mechanism and a separate switch for each valve by means of which any valve may be operated exclusively under the control of the day unit, and other switch means by means of which any valve may be selectively controlled independently of the control mechanism and while the other valves remain under the supervision of said control mechanism.

13. A heating system comprising a main control mechanism for establishing a normal heating program and including separate day and night time-temperature responsive circuit closing devices, a plurality of heat supply valves with electric means for operating the same, said valves being under the supervision of the main control mechanism, a time switch to alternately shift the control of the valves between the day and night circuit closing devices of the main control mechanism, and switch means by which any valve may be selectively maintained under the control of the day program device while the other valves remain under the time temperature program as determined by the time switch.

FELIX A. GUNTHER.